Sept. 2, 1969
T. R. JETER ET AL
3,465,148
METHOD AND MEANS FOR OBTAINING STEADY STATE
OR MICROSECOND ENERGY SPECTRA
IN A NEUTRON SPECTROMETER
Filed Aug. 10, 1967
2 Sheets-Sheet 1
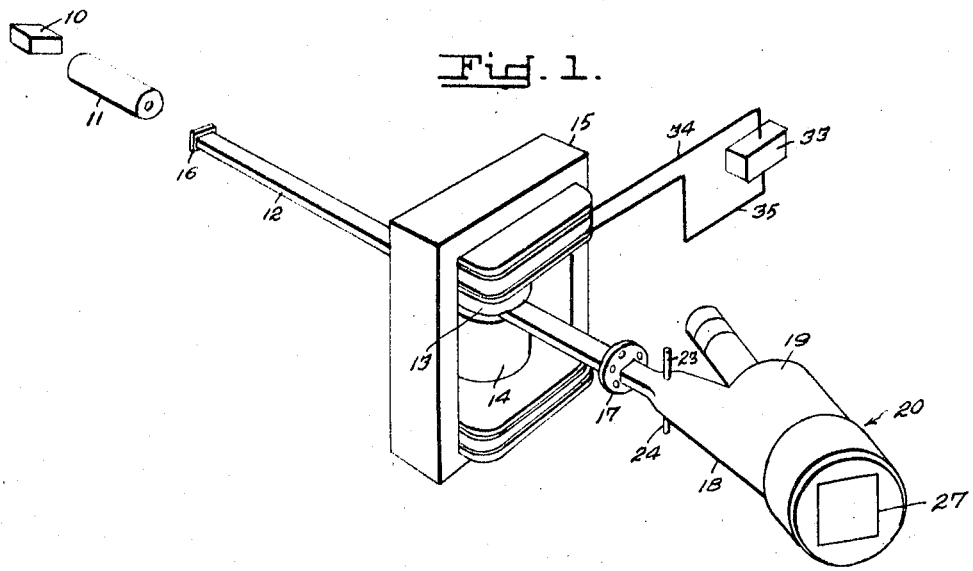
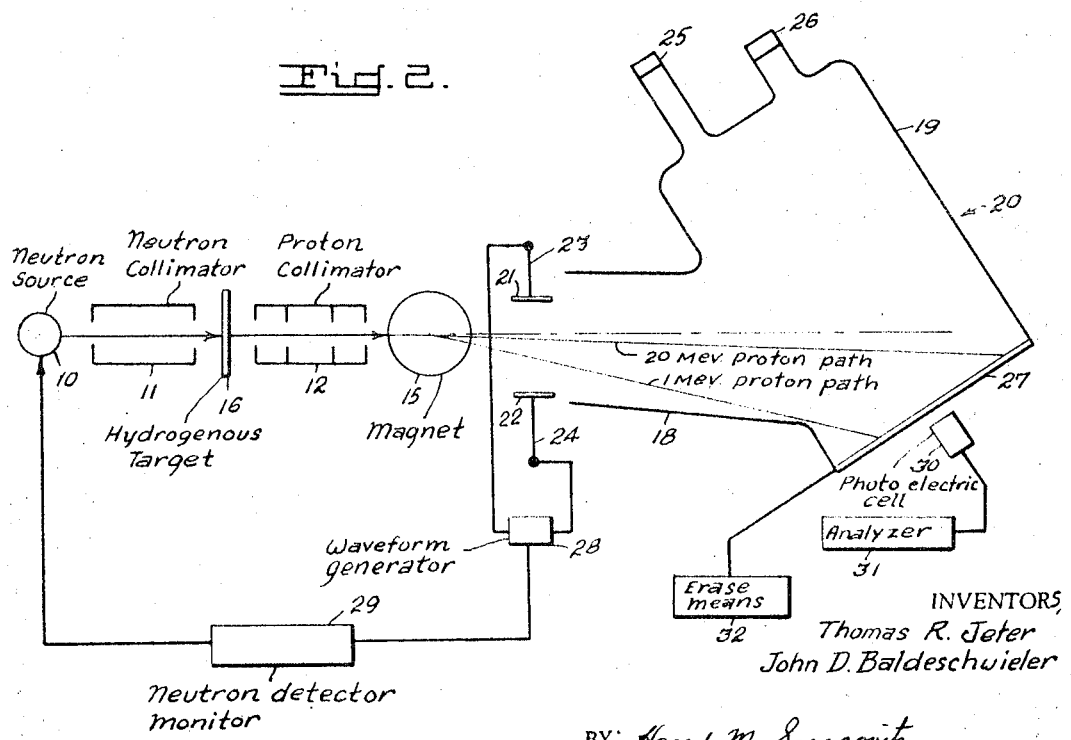
INVENTORS,
Thomas R. Jeter
John D. Baldeschwieler
BY: Harry M. Saragovitz,
Edward J. Kelly, Herbert Berl &
R. P. Gibson          ATTORNEYS.

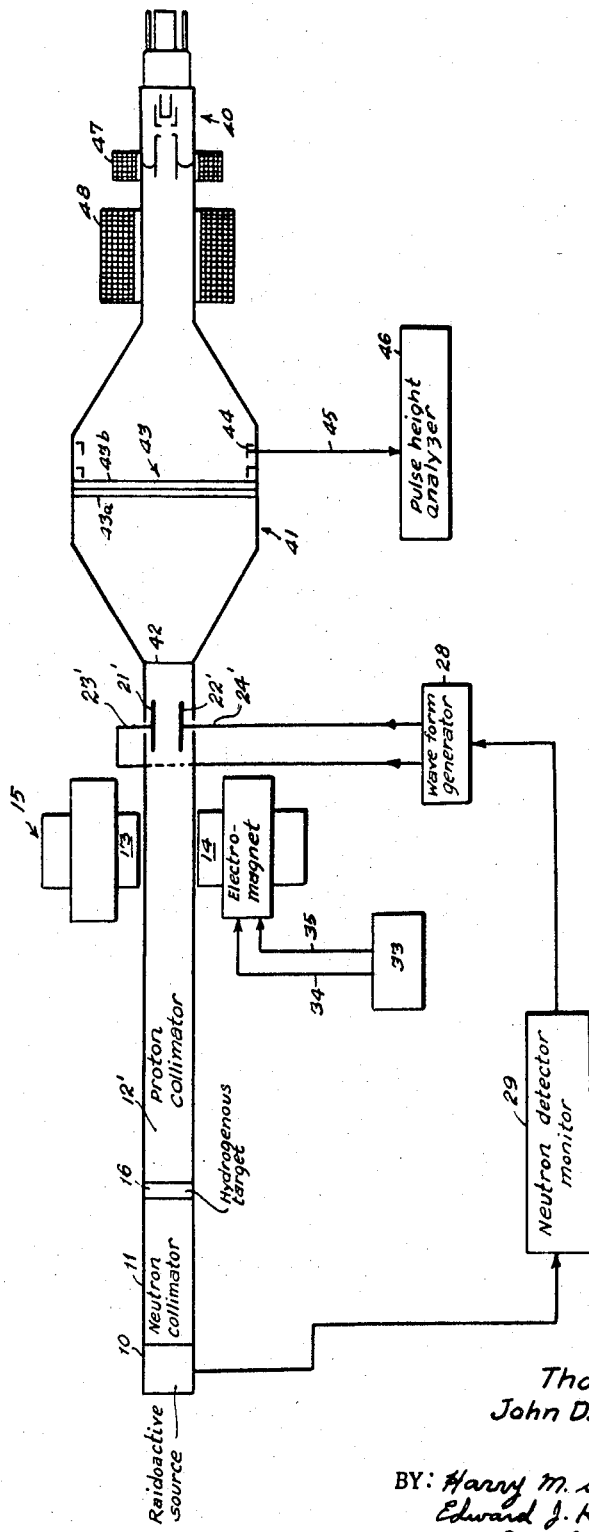

3,465,148
METHOD AND MEANS FOR OBTAINING STEADY STATE OR MICROSECOND ENERGY SPECTRA IN A NEUTRON SPECTROMETER

Thomas R. Jeter, Bel Air, Md., and John D. Baldeschwieler, Portola Valley, Calif., assignors to the United States of America as represented by the Secretary of the Army
Filed Aug. 10, 1967, Ser. No. 660,886
Int. Cl. G01t 3/00
U.S. Cl. 250—83.1                        7 Claims

ABSTRACT OF THE DISCLOSURE

Neutron microsecond spectrometer for and method of measurement of neutron energy from radioactive sources having time durations of several microseconds to infinite duration and wherein a unique momentum analyzer and data storage system is employed to measure the energy of the recoil proton resulting from the radiation incident on a hydrogenous target.

---

The invention described herein may be manufactured and used by or for the Government, for governmental purposes, without the payment to us of any royalty thereon.

The measurement of neutron spectra from bursts or pulsed sources is usually limited to emulsion techniques or crystal spectrometers. These methods and associated apparatus have severe limitations for measurement of neutron spectra from sources with very high flux density and duration of only a few microseconds as encountered in measurement of neutron spectra from nuclear weapons or pulsed reactors. The most serious limitation of both emulsions and crystal spectrometers is their inability to accept a large flux and wide range of energies. Furthermore it is usually not possible to analyze the neutron spectra with a crystal spectrometer in the short period of time of the burst. In the case of emulsions, exposures must be followed by long periods of analysis.

An object of the invention is an improved and novel means for measurement of neutron energy spectra from radioactive sources having the time durations of several microseconds or steady state spectra.

Another object of the invention is a new and novel means and method for measurement of neutron energy spectra which does not contain the severe limitations of the emulsion techniques or crystal spectrometers which exhibit inability to accept a large flux and wide range of energies.

Another object of the invention is a unique arrangement of elements forming a pulse spectrometer capable of obtaining a time resolved spectra in a few microseconds or less and wherein the data obtained therein is stored for analysis at a future time.

Another object of the invention is a unique momentum analyzer and data storage system employed to measure the energy of the recoil proton resulting from the radiation incident on a hydrogenous target.

Another object of the invention is a new and novel method for obtaining steady state or microsecond energy spectra.

The invention will be more fully understood and its objects and advantages further appreciated by referring now to the following detailed specification taken in conjunction with the accompanying drawings in the several figures of which like numerals identify like elements and in which:

FIGURE 1 is a perspective view illustrating the arrangement of the principal elements of the neutron microsecond pulse spectrometer of the invention; and FIGURE 2 is a diagrammatic representation of one embodiment of the invention.

FIGURE 3 is a diagrammatic representation of another embodiment of the invention.

Referring to the drawing, FIGURE 1 is a perspective view of a preferred arrangement of the principal elements of the invention wherein 10 indicates a neutron source coupled to one end of a neutron collimator 11. A proton collimator 12 is positioned between the poles 13 and 14 of an electromagnet 15 comprising a momentum analyzer which is coupled to an electric energy source 33 by means of conductors 34 and 35. Interposed between neutron collimator 11 and the end of proton collimator 12 adjacent collimator 11 is a hydrogenous target 16. The opposite end of proton collimator 12 is coupled by means of flanges 17 to the tapered projection 18 of the envelope 19 of the direct-view electrical storage tube 20 forming a hermetic seal therewith. Tapered projection 18 of envelope 19 houses two vertical deflection plates 21 and 22 which are provided with terminals 23 and 24, respectively. The electrical storage tube 20 is also provided with a writing gun 25, reading 26 and storage screen 27 as generally indicated in the schematic of FIGURE 2. The electronic means for operation of the electrical storage tube 20 are not shown since they are generally known and form no specific part of the invention. Patent No. 2,843,798 illustrates one arrangement of electronic means for operation of such electric storage tubes. The electrostatic deflection plates in combination with waveform generator 28 of known or controllable decay time are utilized to obtain a time resolved storage spectra by discharging the generator 28 across the vertical deflection plates 21 and 22. The spectrum is then recorded vertically as a "smear" on the storage screen 27. Any conventional means may be employed to charge generator 28. Generator 28 is triggered by the neutron detector monitor 29 upon initiation of monitor 29 by neutron source 10.

In practicing the invention, the neutron source 10 is initiated and a pulse of neutrons enters neutron collimator 11 collimated therethrough and impinges on a hydrogenous target 16 causing recoil protons to be emitted therefrom. These protons have an energy that is a function of the incident neutron energy and the angle of recoil. By collimating the recoil protons passing through proton collimator 12 so that only those coming straight forward will emerge from the proton collimator, the proton energy will be a function of only the incident neutron energy. As can be best seen in FIGURE 1, proton collimator 12 is so positioned between the poles 13 and 14 of electromagnet 15 or momentum analyzer that the collimated protons in their travel through collimator 12 are dispersed into particles in various energy groups by the electromagnetic field established between the poles 13 and 14 of electromagnet or momentum analyzer 15 as they pass between these poles. The dispersed momentum or energy groups then pass between vertical deflection plates 21 and 22 of electrical storage 20 to the storage screen of tube 20. The screen 27 of electric storage tube 20 is charged in the usual manner by scanning it with the electron beam produced by the writing gun 25. Vertical deflection plates 21 and 22 are brought into play as hereinbefore recited to position the spectra to be observed or recorded in any desired location on screen 27. The erase means 32 is employed to erase the stored data in screen 27. The spectra or energy groups are recorded on screen 27 from left to right with the low energy. (1 mev.) particles on the left and the high energy (20 mev.) particles on the right when viewed from the front of screen 27. Recording of the particles on screen 27 is accomplished by discharging areas of screen 27 by proton groups striking said areas. The amount of discharge evidenced by the darkening of screen 27 is dependent on the quantity of protons striking a particular spot or area of said screen. A photoelectric cell 30 which scans screen 27 has its output pulse connected to a multichannel analyzer 31 wherein the memory thereof is stored the neutron energy spectra or energy group as manifested in the display shown on screen 27 for analysis at a future time. The mechanics of scanning screen 27 by photoelectric cell 30 may be accomplished by any well known means, for example, by electromechanical means which drives the photoelectric cell vertically and horizontally to scan the area of screen 27. Where it is desired not to obtain a time resolved spectrum, waveform generator 28 is disconnected from deflection plates 21 and 22 and the above-mentioned momentum or energy groups then strike storage or display screen to create a charge image of the spectrum thereon without being deflected vertically across the screen.

FIGURE 3 illustrates another embodiment of the invention wherein a cathode ray tube consisting of an RCA Graphecon, No. 7539, a scan-conversion type tube, is employed in modified form. The writing section of the tube is completely removed and the section of envelope 41 which houses the storage means or target 43 and elements comprising reading gun or section 40 is assembled to proton collimator 12' in hermetically sealed relationship as indicated by reference numeral 42. The beam of reading gun 40 is caused to continuously scan the storage means 43 by fields produced by deflection coils 48. Deflection coils 48 may comprise two pairs of deflection coils connected to a suitable source such as sawtooth generators, not shown, for providing magnetic fields perpendicular to each other and to the axis of gun 40 for scanning the storage means or target 43, all of which is well known in the art. Reference numeral 47 identifies the focusing coil. Although a reading gun employing magnetic-deflection and magnetic-focusing means is shown and described, it is to be understood reading guns employing electrostatic-focusing and electrostatic-deflection means may also be utilized. Proton collimator 12' is provided in the interior thereof intermediate storage means 43 and electromagnet 15 with a pair of deflection plates 21' and 22' having terminals 23' and 24', respectively, which pass through and are insulated from the wall of collimator 12'. The end of collimator 12' remote from the end housing deflection plates 21' and 22' is provided with the hydrogenous target 16 coupled to neutron collimator 11 which in turn is coupled to neutron source 10 as described in conjunction with FIGURES 1 and 2. Waveform generator 28 has its output coupled to terminals 23' and 24' of the deflection plates and is discharged across the deflection plates when triggered by neutron detector monitor 29 upon initiation of monitor 29 by neutron source 10 when it is desired to obtain a time resolved spectra. In one form target 43 may consist of a very thin metallic film comprising the signal plate 43a of target 43 and a dielectric film 43b. The collimated recoil protons penetrate signal plate 43a into dielectric film 43b producing a charge pattern of the spectra on film 43b which is scanned continuously by the electron beam of reading gun 40 resulting in signal pulses being generated which are taken off through output signal electrode 44 and coupled to the pulse height analyzer 46 by conductor means 45.

Although specific embodiments of the invention have been illustrated and described, it will be understood that this is but illustrative and that various modifications may be made therein without departing from the spirit of the invention and scope of the appended claims.

What is claimed is:

1. A neutron microsecond pulse spectrometer for displaying neutron energy spectra having burst widths from short bursts to infinite duration comprising in combination, means coupled to a radio active source for producing collimated neutrons, hydrogenous means coupled to said first means producing recoil protons in response to the collimated neutron impinging on said hydrogenous means, electrical storage tube means, means for collimating said recoil protons coupling said hydrogenous means with the screen of electrical storage tube whereby said recoil protons are transmitted to and bombard said screen, and magnetic means operatively connected with said means for collimating said recoil protons to cause said recoil protons to fan out into various energy groups which strike said screen and produce a recoil proton energy spectra in the form of charges across said screen.

2. A neutron microsecond pulse spectrometer for storing and displaying neutron energy spectra having burst widths from short bursts to infinite duration comprising in combination, a radioactive source, a neutron collimator coupled to said radioactive source, a proton collimator, a hydrogenous target coupling said neutron and proton collimators, a direct-view electrical storage tube coupled to said proton collimator, said neutron collimator collimating neutrons emitted by said source, the collimated neutrons impinging on the hydrogenous target to cause emissions of recoil protons therefrom, said recoil protons striking the screen of said direct-view electrical storage tube to produce a visual representation of said energy spectra, and means for dispersing said recoil protons into various energy groups whereby a visual representation of the energy spectra of said groups is obtained across said screen.

3. The invention in accordance with claim 2 wherein said means comprise electromagnetic means producing a magnetic field traversely of the path of said recoil protons in said proton collimator whereby said recoil protons are fanned out into various energy groups which strike said screen causing a visual presentation of the energy spectra of said groups.

4. An instrument for measuring and recording neutron energy spectra from radioactive sources having burst widths from short bursts to infinite duration comprising in combination, a neutron collimator having an input end and output end, the input end of said neutron collimator being in the environment of said sources, a proton collimator having an input end and an output end, a hydrogenous target positioned between the output end of said neutron collimator and the input end of said proton collimator whereby the neutrons collimated by said neutron collimator impinge on said hydrogenous target causing the emission of recoil protons which are collimated by said proton collimator, a direct-view electric storage tube provided with a pair of deflection plates in alignment with said proton collimator, the output end of said proton collimator coupled to said storage tube adjacent said vertical deflection plates, a magnet embracing said proton collimator adjacent the output end for dispersing the collimated recoil protons into various paths of various energy groups, a voltage waveform generator, the output of said generator coupled to said vertical deflection plates for vertically deflecting the recoil protons in said various paths whereby the recoil protons in said various energy paths are caused to sweep the storage screen of said direct-view electrical storage tube to produce a charge pattern image of the recoil proton energy spectra thereon, a neutron detector monitor, the input of said neutron detector monitor coupled to the environment of said sources and the output coupled to said waveform generator for triggering said waveform generator in response to activation of said sources whereby a voltage ramp is applied to said vertical deflection plates to cause deflection of said recoil protons in said various paths, and means for recording and storing the recoil proton energy spectra displayed on said storage screen comprising photoelectric means for scanning said storage screen, and electronic analyzer-memory means coupled to said photoelectric means.

5. The method of measuring the energy or time distribution of neutrons in a pulse of very short duration comprising the steps of: converting a beam of neutrons into a beam of recoil protons having directly corresponding energy; deflecting said recoil protons to form a fan of recoil protons having diverging angles from the proton beam direction that vary with recoil proton energy; deflecting said fan of recoil protons perpendicularly to the plane of said angles with time during said pulse to create a substantially planar record on the storage screen of an electronic storage tube of the recoil protons density distribution with both time and proton energy; scanning the storage screen of said tube by electrical photosensitive means whereby said planar record is converted into electrical signals in the output of the electrical photosensitive means; integrating said electrical signals; and storing said integrated electrical signals in memory means to obtain a neutron energy spectrum record.

6. A neutron microsecond pulse spectrometer for measuring and recording neutron energy spectra from radioactive sources having bursts widths from short bursts to infinite duration comprising in combination, a neutron collimator having an input end and an output end, the input end of said neutron collimator coupled to said sources, a hydrogenous target, said hydrogenous target coupling the output end of said neutron collimator with the input end of said proton collimator whereby neutrons collimated by said neutron collimator impinge on said hydrogenous target causing emission of recoil protons therefrom which are collimated by said proton collimator, a magnet embracing said proton collimator adjacent its output end for dispersing the collimated recoil protons into various paths of various energy groups, an electronic reading gun of the cathode ray type including a storage target and means to cause the electron beam of said gun to continuously scan one surface of said target, said gun formed integrally with the output end of said proton collimator with the storage target thereof having a second surface oppositely disposed to said one surface facing the output end of said proton collimator whereby the recoil protons of said various energy groups emanating from proton collimator strike said second surface to form a charge pattern in said storage target representative of the recoil proton energy spectra of said various energy groups, said electron beam scanning said one surface of said storage target containing said charge pattern to produce output signal pulses, a pulse height analyzer, and signal conductive means coupling said storage target with said pulse height analyzer whereby said pulses are applied to said pulse height analyzer.

7. A neutron microsecond pulse spectrometer for measuring and recording neutron energy spectra from radioactive sources having bursts widths from short bursts to infinite duration comprising in combination, a neutron collimator having an input end and an output end, the input end of said neutron collimator coupled to said sources, a proton collimator having an input end and an output end, a hydrogenous target coupling the output of said neutron collimator with the input of said protons collimator whereby neutrons collimated by said neutron collimator impinge on said hydrogenous target causing emission of recoil protons therefrom which are collimated by said proton collimator, an electromagnet embracing said proton collimator adjacent its output producing a field transversely of said proton collimator whereby said recoil protons are fanned out into various energy groups, a pair of deflection plates positioned within said proton collimator in insulated relationship thereto between said electromagnet and the output between which said various energy groups pass, an electronic reading gun of the cathode ray type including a storage target and means to cause the electron beam of said gun to continuously scan one surface of said target, said gun formed integrally with the output end of said proton collimator with the storage target thereof having a second surface oppositely disposed to said one surface facing the output end of said proton collimator whereby the recoil protons of said various energy groups emanating from proton collimator strike said second surface to form a charge pattern in said storage target representative of the recoil energy spectra of said various energy groups, and means for deflecting said various energy groups across the storage target to obtain a time resolved spectra consisting of a voltage waveform generator having its output coupled to said deflection plates, a neutron detector monitor having its input connected to said sources and its output connected to the input of said voltage waveform generator, said neutron detector monitor triggering said waveform generator in response to activation by said sources whereby a voltage ramp is applied to said deflection plates to cause said various energy groups to sweep across said second surface forming a time resolved charge pattern image of said recoil proton energy spectra in said storage target, said electron beam scanning said one surface of the storage target containing said time resolved charged pattern to produce output signals, a pulse height analyzer, and signal conductive means coupling said storage target with said pulse height analyzer whereby said pulses are applied to said pulse height analyzer.

References Cited

UNITED STATES PATENTS 2,642,535   6/1953   Schroeder.

OTHER REFERENCES

Use of the Four-inch Liquid Hydrogen Bubble Chamber as a Fast-neutron Spectrometer by Adelson et al., from Review of Scientific Instruments, vol. 31, No. 1, January 1960, pp. 1–10; 250–83.1.

ARCHIE R. BORCHELT, Primary Examiner

U.S. Cl. X.R.

250—41.9